(12) United States Patent
Hotti

(10) Patent No.: US 7,136,912 B2
(45) Date of Patent: Nov. 14, 2006

(54) METHOD AND SYSTEM FOR DATA MANAGEMENT

(75) Inventor: Timo Hotti, Helsinki (FI)

(73) Assignee: Solid Information Technology OY, Helsinki (FI)

( * ) Notice: Subject to any disclaimer, the term of this patent is extended or adjusted under 35 U.S.C. 154(b) by 852 days.

(21) Appl. No.: 09/779,898

(22) Filed: Feb. 8, 2001

(65) Prior Publication Data

US 2002/0107920 A1 Aug. 8, 2002

(51) Int. Cl.
*G06F 15/173* (2006.01)
(52) U.S. Cl. ............... 709/223; 709/202; 709/204; 707/9; 707/10
(58) Field of Classification Search ............ 709/204, 709/202, 223; 707/9, 104.1, 1, 10
See application file for complete search history.

(56) References Cited

U.S. PATENT DOCUMENTS

| | | | |
|---|---|---|---|
| 5,706,507 A * | 1/1998 | Schloss ................. 707/104.1 |
| 6,157,953 A * | 12/2000 | Chang et al. ............ 709/225 |
| 6,192,416 B1 * | 2/2001 | Baxter ..................... 709/248 |
| 6,360,102 B1 * | 3/2002 | Havinis et al. .......... 455/457 |
| 6,363,411 B1 * | 3/2002 | Dugan et al. ............ 709/202 |
| 6,442,285 B1 * | 8/2002 | Rhoads et al. .......... 382/100 |
| 6,449,632 B1 * | 9/2002 | David et al. ............. 709/202 |
| 6,574,617 B1 * | 6/2003 | Immerman et al. ........... 707/1 |
| 6,731,927 B1 * | 5/2004 | Stern et al. ............. 455/414.1 |
| 2003/0017801 A1 * | 1/2003 | Mackay .................. 455/3.01 |

FOREIGN PATENT DOCUMENTS

| EP | 0860788 | 8/1998 |
|---|---|---|
| WO | WO 00/79415 | 12/2000 |

OTHER PUBLICATIONS

Stevens, W.R., "The Protocols," TCP/IP Illustrated, 2000, vol. 1, p. 33, Reading, MA.

* cited by examiner

*Primary Examiner*—Saleh Najjar
*Assistant Examiner*—Liang-che Alex Wang
(74) *Attorney, Agent, or Firm*—Young & Thompson

(57) ABSTRACT

The invention relates generally to the use of databases. Preferably the invention relates to a method and a system associated with the use of databases with mobile terminals. The objective of this invention is to present a method and a system which allows managing a large dynamically changeable set of applications in the mobile Internet. The objectives of the invention are attained by determining user profiles within communities, and the rights for using applications of a community server depends on the profiles of the user within the community. The identity information is preferably maintained in an identity server. The invention provides a solution to the problem of managing services and configuration of smart network node in environments where the services and their content data need to be managed remotely from multiple remote sources in a dynamic manner.

49 Claims, 6 Drawing Sheets

METHOD AND SYSTEM FOR DATA MANAGEMENT

TECHNICAL FIELD OF THE INVENTION

The invention relates generally to the use of databases. The invention relates preferably to a method and a system associated with the use of databases with mobile terminals.

BACKGROUND ART OF THE INVENTION

The following notions are used in this application:

"Data management system" is an entity, which comprises one or more databases and/or data management systems, whereby the system is responsible for reading the data structures contained in the databases and/or data management systems and for changing these data structures.

"Database" is an information structure, which comprises one or more data elements, and the use of which is controlled by the data management system. The invention is applicable both in relational databases and in databases of other forms, such as in object oriented databases.

"Data element" is an information structure, which can comprise other data elements or such data elements, which can be construed as atomary data elements. For instance, in a relational database data elements are represented by tables comprising rows. The rows comprise fields, which are typically atomary data elements.

"Database operation" is an event, during which data elements are read from the database, during which data elements of the database are modified, during which data elements are removed from the database, and/or during which data elements are added to the database.

"Transaction" is a plurality of database operations acting on the data elements. A transaction can also comprise further transactions.

"Database Catalog" is a logical database within a database instance. A physical database can manage data of multiple database catalogs. Each database catalog can act as an independent master or replica database node in a database synchronization environment.

"Database Schema" is the structure of a database system, described in a formal language supported by the database management system (DBMS). In a relational database, the schema defines the tables, the fields in each table, and the relationships between fields and tables.

"Master database" is a database catalog in a database synchronization system that contains the official version of synchronized/distributed data. A master database can have multiple replica databases.

"Replica database" is a database catalog in a database synchronization system that contains a full or partial tentative copy of the master data.

"Synchronization" is operation between replica and master database catalogs in which changed data is exchanged between the catalogs. In one known embodiment, this means propagation of Intelligent Transactions from replica to master and/or subscription of changed data of publications from master to replica.

"Publication" is a set of data in a database catalog that has been published in master database for synchronization to one or multiple replica databases.

There are presently some software push technologies available that are capable of pushing a set of software files to terminals and keeping the once-installed configuration up-to-date by pushing upgrade files to the terminal on an as-needed basis. This means that the software that is stored and run locally in the terminal can be managed remotely.

However, this technology does not address the requirements of mobile users and wireless communities where it is important to manage a potentially large, dynamically changing set of applications. For instance, the list of services available to that terminal, i.e. the "desktop" of the terminal, is relatively static and cannot be easily changed to reflect different roles and locations of the user of the terminal.

Many web portals allow personalization of their home pages so that different users can have different view to the list of services provided by the portal. This perzonalization data is separate for each portal and it cannot be utilized when using another portal. Moreover, web portal personalization techniques are applicable only to web-based applications, i.e. services that are provided by a server that resides in the network.

For these reasons, the current web service personalization technology that operates on isolated and proprietary user profile data is not feasible in environments, where there are potentially a very large number of application service providers, e.g. one per each wireless base station, which all need to conform with the personal preferences of the user and capabilities of the current terminal of the user.

SUMMARY OF THE INVENTION

The objective of this invention is to present a method and a system which allows managing a large dynamically changeable set of applications in mobile Internet.

The objectives of the invention are attained by specifying user preferences with an identity server, and matching the preferences with applications of a community server. The result of the match is stored in a service assembly point. This invention also introduces the concept of Identity Data, which is maintained in the Identity Server, and is an essential part in process of joining to a new community. Examples of Identity Data may include name, address, age, size, weight, sex, profession, hobbies, personal interests, etc.

The invention provides a service matchmaking method that efficiently matches the users preferences and available services of a community into a list of local and web-based services that is of interest to the user.

The invention thus provides a solution to the problem of managing services and configuration of smart network node in environments where the services and their content data need to be managed remotely from multiple remote sources in a dynamic manner based on preferences of the user and capabilities of the currently used terminal. The related service data may include the availability, registered users, application binary files, configuration, parameter requirements, classification, etc.

A typical example of a dynamically configurable smart network node according to the invention is a so-called smart phone. The user of a smart phone has different roles in different communities depending on location, time of day and personal preferences. For example, during workdays from 8 AM to 5 PM, a person can have a "Boss" role in a "Work" community. In his role, Me person wants to have access to corporate intraweb, e-mail and chat applications through his terminal. Outside business hours, this same person may want to use applications that are available to him via the "Dad" role in his "Home" community. The services may run in the network servers or alternatively, they can run locally in the smart terminals. To ensure ease of use of the terminal, managing the "desktop", i.e. determining the services available to the user in his current role, should be done centrally in each of the communities. No or minimal amount of user interaction is necessary to manage the configuration of the terminal.

With the present invention it is possible to remotely manage software configuration and content data of a terminal from various community servers and keep the terminal data automatically in synchronization with the community server's data by using a known, generic relational and transactional data synchronization mechanism. Also the distinction between Community Data and Identity Data is possible.

The communication between the client terminal and the servers is preferably at least in part wireless communication in order to provide a mobile terminal, but the communication can also be wireline communication. The "Service Assembly Point" (SAP) may be a server or a client terminal with a wireless or wireline connection to the Community Server.

The method according to the invention for managing data in a system comprising at least one community, at least one user, at least one community system comprising at least one database, and at least one application, at least one service assembly point (SAP) comprising at least one database, and means for communication between a community system and a service assembly point, is characterized in that at least one service assembly point is a member of at least one community, the users can be members in a community with different profiles, and the users may use applications of a community according to said profiles.

The invention also relates to a storage media comprising a stored, readable computer program, which is characterized in that the program comprises instructions for controlling a data management system or components thereof to implement the method according to the invention.

The invention further relates to a data management system comprising at least one community and at least one user, at least one community system comprising at least one database and at least one application, at least one service assembly point (SAP) comprising at least one database, and means for communication between a community system and the service assembly point, which is characterized in that at least one service assembly point is a member of at least one community, the users of the SAPs can be members in a community with different profiles, and the users of the SAPs may use applications of a community according to said profiles.

The invention further relates to a community server for a data management system, the community server comprising at least one community, at least one database, at least one application, and means for communication between the community system and a service assembly point (SAP) of the data management system, which is characterized in that the community server comprises means for joining service assembly points into communities, means for providing the users of the SAPs that are members in a community with different rights of use, means for allowing the users of the SAPs to use applications of a community according to said rights of use.

Some preferred embodiments of the invention are described in the dependent claims.

BRIEF DESCRIPTION OF THE DRAWINGS

Below the invention is described in more detail with reference to preferred embodiments shown as examples and to the enclosed figures, in which.

DETAILED DESCRIPTION

Figure 1:
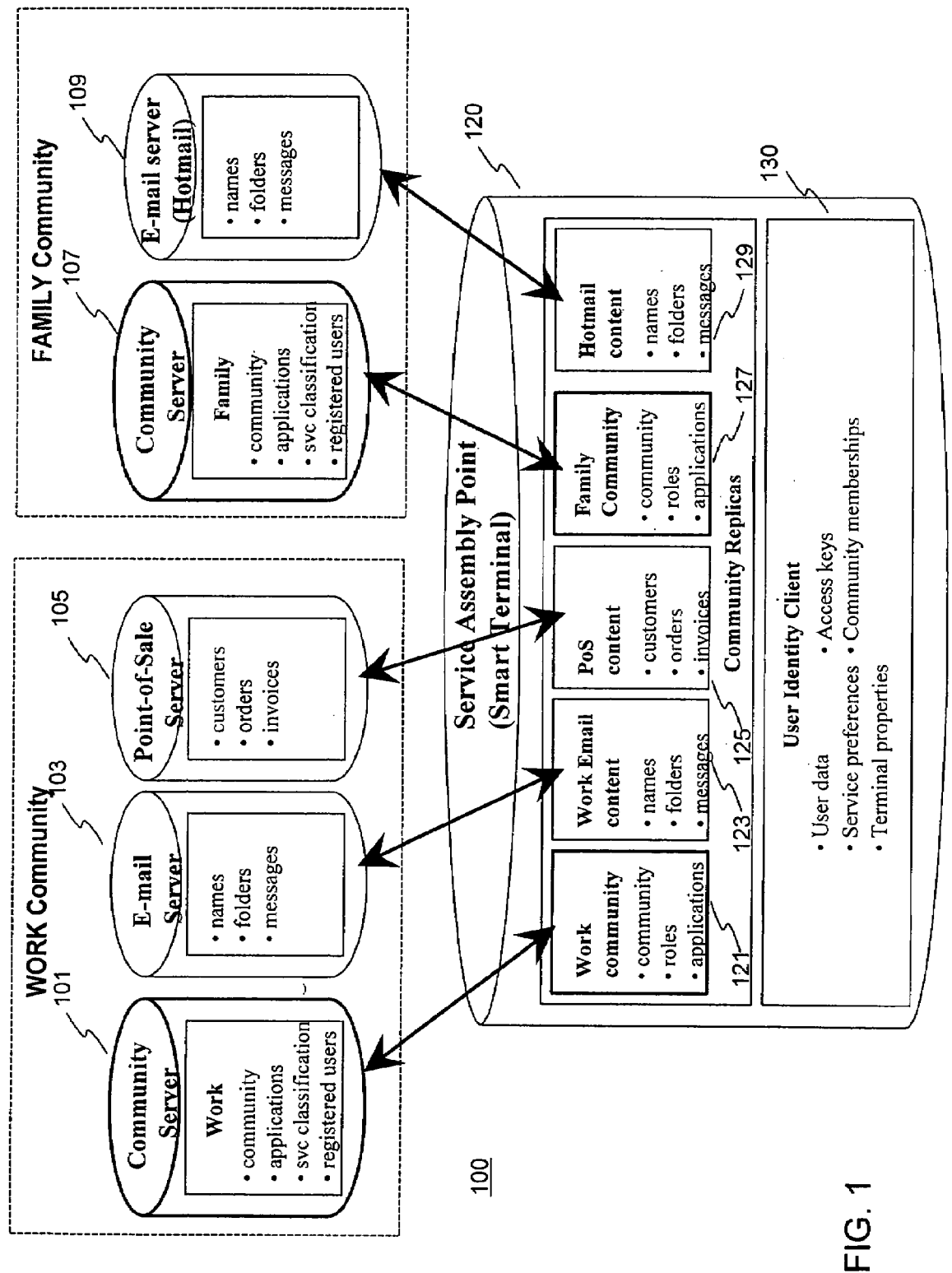
FIG. 1 shows some parts of an examplary system according to the invention.

FIG. 1 shows an example of parts of a system 100 according to the invention. The user has a locally runnable software and content of a smart terminal 120, which is in communication with the "Community Client", which is managed by one or multiple application and content management servers, "Community Server" 101, 107, and "Content Server", 103, 105, 109, respectively. The applications and pointers to web based applications are stored in the managed data storage, e.g, relational database, of the Community Servers. The content data of the applications may be managed and distributed using Content Servers. The identity data, such as User ID, name, access keys etc., of the user of the Community Client is maintained in the User Identity Client 130 of the Community Client terminal 120. The identity data may also be maintained in a separate Identity Server that is synchronized with the identity clients of the user (not shown in FIG. 1). The profile information of the users can be maintained in the Identity Server. The community replicas are stored in the databases 121, 123, 125, 127, 129 of the client terminal. The smart terminals can maintain a full or partial copy (replica) of the servers' data using suitable data synchronization technology, such as functionality disclosed in patent application document EP 0 860 788.

Figure 2:
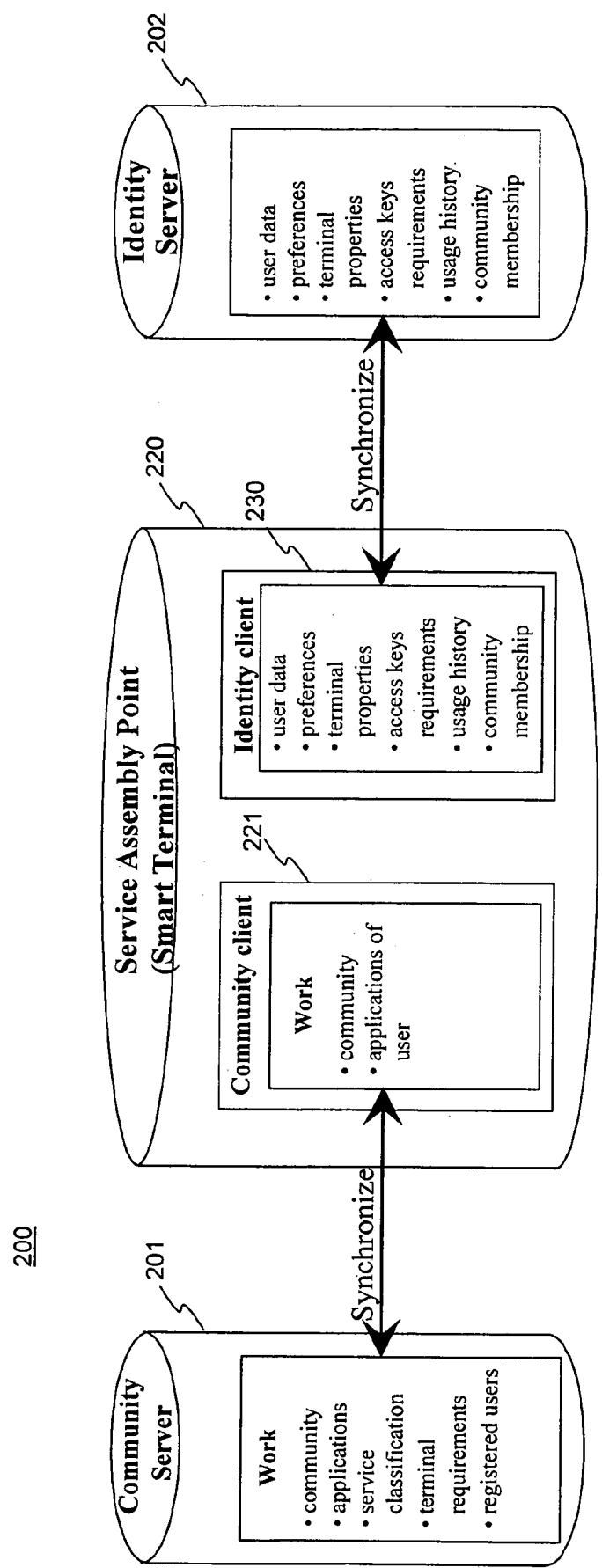
FIG. 2 shows the basic units of an examplary system according to the invention.

FIG. 2 shows an examplary mobile Internet system according to the invention that consists of three main components: Community Server 201 for managing and classifying Services, Identity Server 202 for managing User Identity and Service Assembly Point (SAP) 220 that is typically a Smart Terminal but can also reside in any other type of network node. Such a network node may be e.g. a base station controller, access router, optical network router, etc. The invention provides a solution for the problem of bringing a user of the SAP a subset of locally executable or network based services that match the published user preferences and terminal capabilities of the currently used terminal.

Community Server

In the mobile Internet, there can potentially be a very large number of sources for the services. In this invention, these sources of services are called Mobile Communities. A service of the community can be network-based (i.e. it runs on a server that resides in the network) or it can be run locally in the Service Assembly Point.

The nature of the services can be described by classifying them using commonly agreed service classes. The service classes describe the nature of the service at different levels of detail. For instance, a commonly known "Tetris" game can belong to "TETRIS", "SPEED GAMES", "UNINTELLIGENT GAMES", "GAMES" and "EVERYTHING" service classes.

In the invention, the services and their classifications are preferably managed by an entity called Community Server.

Identity Server

Each user of the Mobile Internet has his/her own identity. The Identity Data of the user can contain for instance following categories of data:
  Basic Identification Information has the unique identifier of the user, name and address information of the user, currently active role of the user etc.;
  Service Preference Information contains the list of service classes that are of interest to the user;
  Access Keys to facilitate secure access to those services that require heightened security;
  Location and Service Usage History of the user, i.e. current and past locations where the user has been; and
  Terminals of the user, such as PCs, mobile phones, communicators & information appliances.

In the invention, the User Identity is preferably managed by an entity called Identity Server. The identity server can synchronize its data with the identity clients of one or multiple Service Assembly Points. Another possibility is to maintain the Identity Data only in the Service Assembly Point if there is no need to share identity information across devices.

Service Assembly Point

The Service Assembly Point is a node in the network, typically a Smart Terminal, where the list of services that is of interest to the user, which can be provided through the terminal that's currently in use, is stored.

When a user wants to assemble a service list from a community server to be used in a Service Assembly Point, following steps are taken:
1) To ensure that the Service Assembly Point has the most recent version of the user identity data, it synchronizes its Identity Database Replica with the Identity Database Master that runs in the Identity Server. This step is not necessary if the SAP's version of the user's identity data is known to be the most recent version.
2) The Service Assembly Point establishes a connection with the Community Server's master database and creates a local replica of the database to the SAP. This step is not needed if the replica for that Community Server has been created earlier.
3) The Service Assembly Point publishes user's preference and terminal property data to the Community Server and invokes the service matchmaking process in the Community Server for instance by using data synchronization techniques such as SOLID Intelligent Transaction disclosed in document EP 0 860 788.
4) The service matchmaking process produces a list of services in the Community Server that is synchronized back to the community replica database of the Service Assembly Point.
5) The list of services is shown to the User.
6) To invoke a service, the User selects the service from the list.
7) If the service is to be executed locally in the Service Assembly Point, the service binaries and resources are downloaded from the Community Server to the local replica of the community using e.g. data synchronization techniques such as publications, unless downloaded already earlier. If the service is located by a network-based application server, the service is located and invoked by using the Uniform Resource Locator (URL) of the service.

Whenever the User needs to refresh the list of available services (e.g. when he/she changes preferences) or services of the community are changed, this can be done by re-executing steps 3–5 of the above sequence of steps.

Figure 3:
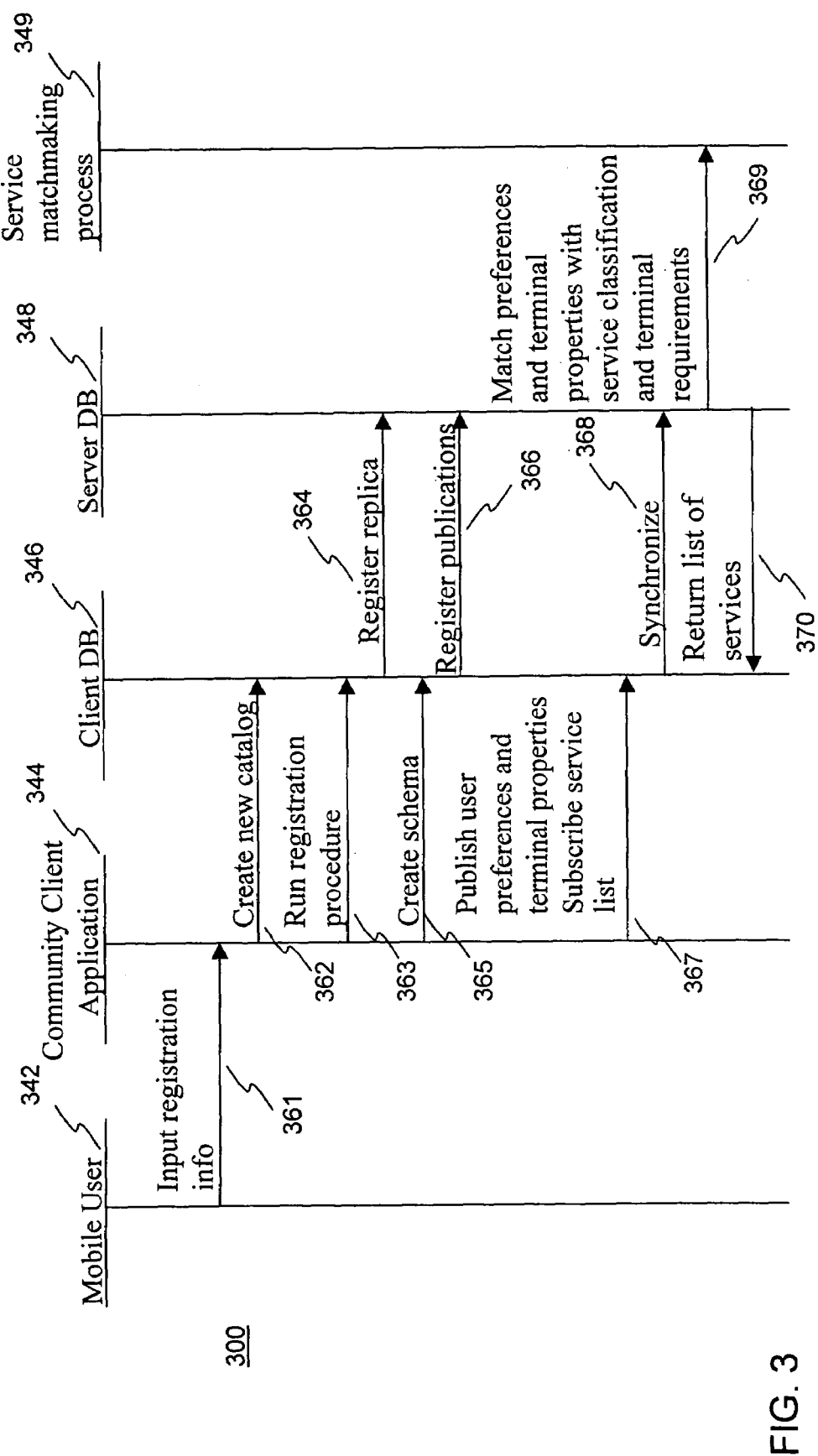
FIG. 3 shows a flow diagram of examplary steps for joining a community and a producing a set of applications to the client in a method according to the invention.

FIG. 3 shows a flow diagram of examplary steps for joining a community in a method according to the invention. The logical terminal 342 can establish a relationship with a new Community Server by registering itself with the server. At registration, 361, the database management system of the Community Client reserves a new area (e.g. database catalog) for the data of the new Community Server, 362. After creating the database catalog, the Community Client authenticates itself with the Community Server database, 363–367, using the locally maintained identity data and downloads meta-data about the Community Server's database to the new database catalog of the terminal. The meta-data contains information necessary to create the replica database schema, 365, and to synchronize the replica database later with the master database of the Community Server, 368.

Once the registration and meta-data download has successfully completed, the terminal database creates a database schema to the newly created catalog using scripts that have been sent from the community server to the terminal database as part of meta-data. Finally the preferences and terminal properties are matched with service classification and terminal requirements, 369, in a Service matchmaking process. The service matchmaking efficiently matches the user's preferences and available services of a community into a list of local and web-based services that is of interest to the user. After this, the new replica catalog can download community and application's header data from the community server's database by subscribing to Community publication.

Figure 4:
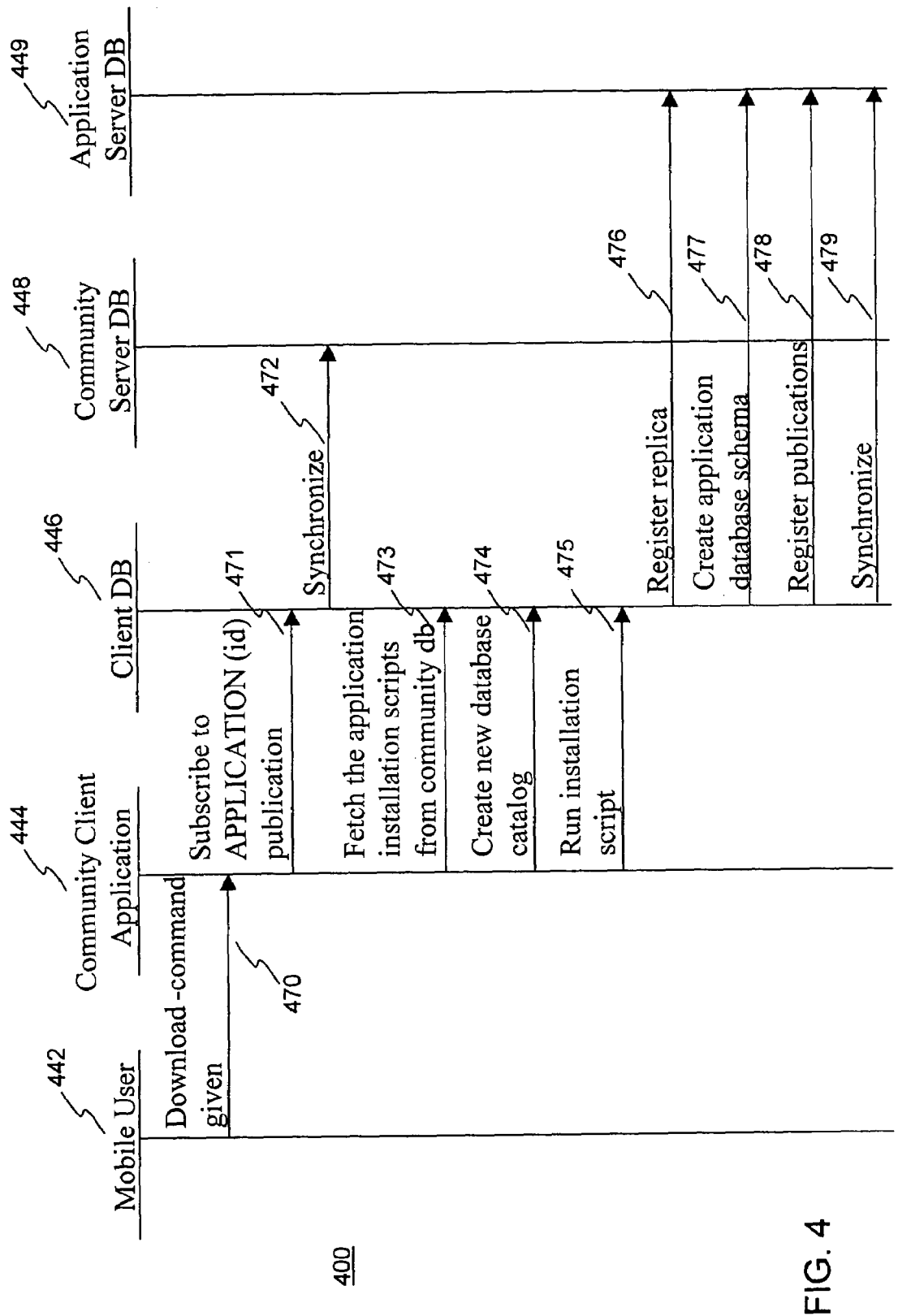
FIG. 4 shows a flow diagram of examplary steps for downloading and installing an application in a method according to the invention.

FIG. 4 shows a flow diagram of examplary steps for downloading and installing an application in a method according to the invention. The smart terminal can build its "desktop" i.e. links to its available services based on the data it has synchronized from the Community Server. This can be done for example by selecting a catalog from the Community Client's database, selecting a current role from the roles table of the catalog and listing the applications of the selected role in the user interface. The binary code, resources and installation scripts of the applications can be downloaded to the terminal, 470, separately by subscribing to a separate Application (APPLICATION_ID) publication, 471. In his publication, the APPLICATION_ID identifies the application whose binaries, resources and installation scripts are to be downloaded.

If the downloaded application requires a local Content database that is possibly synchronized with another database, the downloaded application's meta-data can contain scripts that create a separate database catalog, 472–474, for the content data of the application and register this new catalog with the master database of the Content Server. These scripts are executed, 475, after successful subscription of the APPLICATION publication.

Figure 5:
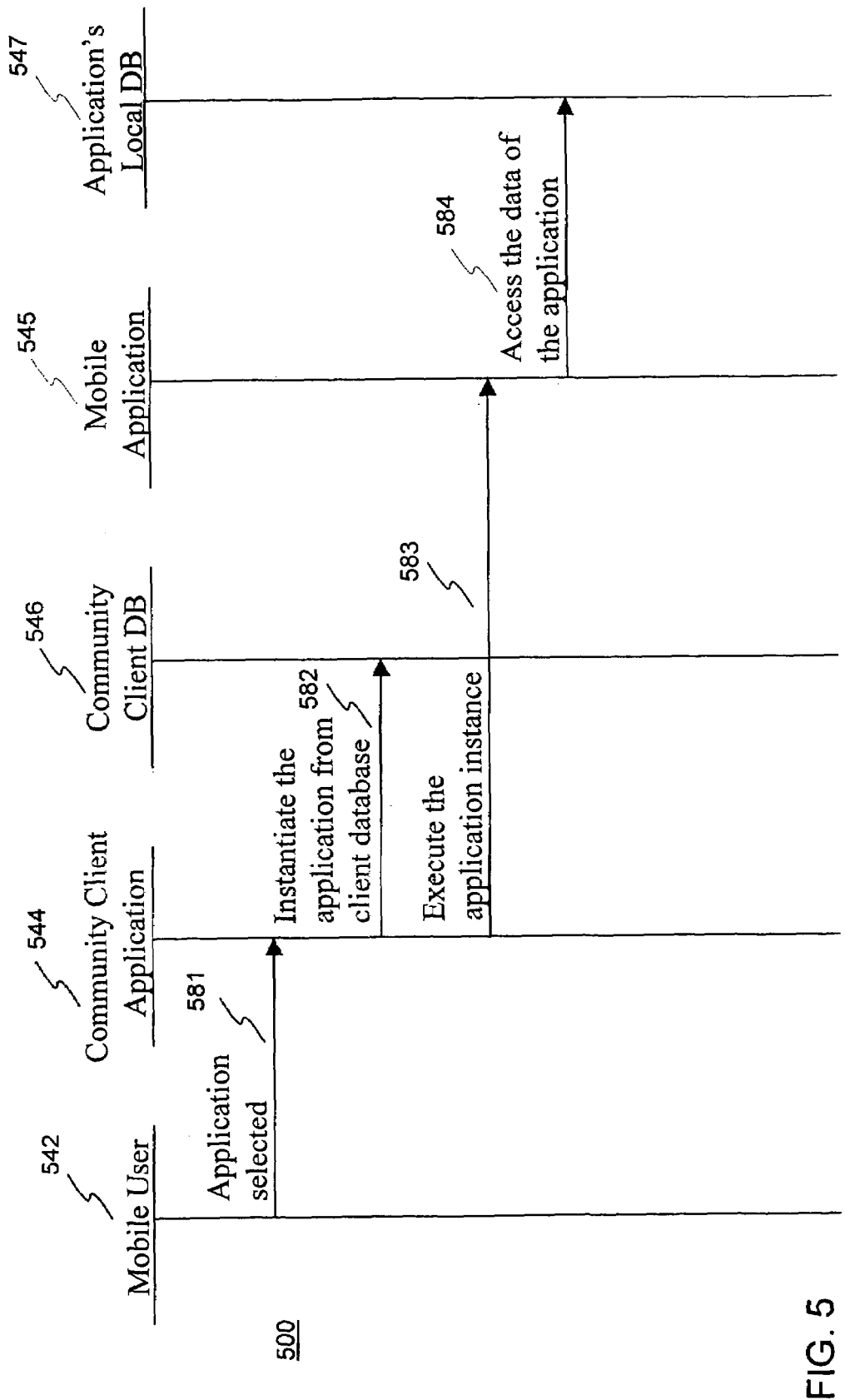
FIG. 5 shows a flow diagram of examplary steps for running an application in a method according to the invention.

FIG. 5 shows a flow diagram of examplary steps for running an application in a method according to the invention. The user of the terminal can run an application by selecting the application from the user interface, 581. This invokes the application loader program that instantiates the selected application from the database tables to the main memory of the terminal, 582, and executes the program, 583, 584. Because the applications reside in the synchronizable local database, their consistency is always guaranteed by the generic data synchronization mechanism of the data management components of the Community Client and Server nodes. When application configuration is changed in the Community Server database, the new version is automatically downloaded to the Community Client when the databases are synchronized next time.

When the user does not need the services of the Community any more, the service suite of that Community can be deleted from the terminal simply by unregistering The replica database and by dropping the catalog and its content from the database.

Figure 6:
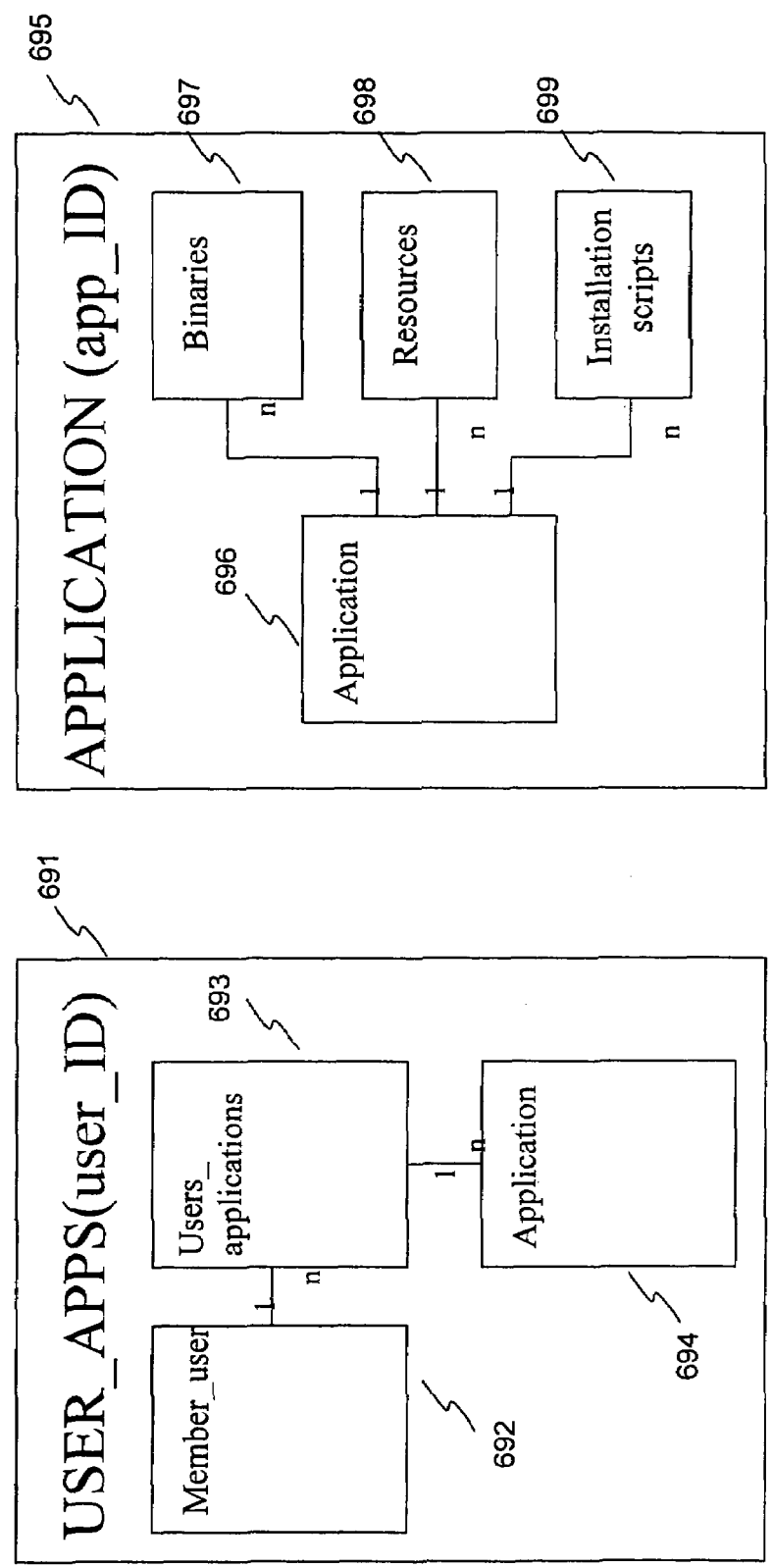
FIG. 6 shows two examplary publications in a system according to the invention.

FIG. 6 shows a publication which can be used in implementing the present invention. Publication comprises a set of data in a database catalog that has been published in master database for synchronization to one or multiple replica databases. In the publication the USERS_APPS (user_ID) identifies the member user 692, the applications of the user 693 and the applications 694, In the publication, the APPLICATION(app_ID) 695 identifies the application 696 whose binaries 697, resources 698 and installation scripts 699 are to be downloaded to the client terminal.

A system according to the invention can be implemented by a person skilled in the art with state of the art information technology and communication technology components. A person skilled in the art can implement the functions according to the invention by arranging and programming such components to realize the inventive functions.

For example, it is preferable to implement the invention to work in a telecommunication system, which is compliment with at least one of the following: TCP/IP, CDMA, GSM, GPRS, WCDMA, UMTS, Teldesic, Iridium, Inmarsat, WLAN and imode, It is also preferable to use a standardized operating system in the terminals and servers. The operating system of a terminal can be, for example, Unix, MS-windows, EPOC, NT, MSCE, Linux, PalmOS and GEOS. The community server and/or the identity server may have at least one of the following operating systems: Unix, MS-windows, NT and Linux.

To a person skilled in the art it is obvious that in order to have an illustrative description the above presented exemplary embodiments have a structure and a function which are relatively simple. By applying the model presented in this application it is possible to design different and very complicated systems which, in obvious ways to the expert, utilise the inventive idea presented in this application.

The invention claimed is:

1. A method for managing data, the method comprising the steps of:

in a community system offering a plurality of services and including at least one service database containing service data, at least one identity database containing user-specific data defining user preferences, at least one service access point (SAP) having at least one user database communicating with said service database and said identity database, maintaining user-specific data of at least one user of said at least one service access point (SAP) in the at least one identity database, maintaining service data of at least one service in the at least one service database, publishing at least part of the user-specific data of the at least one identity database to the at least one service database, and determining, in the at least one service database, a list of services from said plurality of services based on the published user-specific data for said at least one user database.

2. The method according to claim 1, wherein the method further comprises a step of exchanging user-specific data between said identity database and said service access point (SAP) by synchronizing the data between said identity database and said user database.

3. The method according to claim 1, wherein user-specific identity and preference data is replicated from the identity database to the user database so that the user database has at least a partial copy of said identity and preference data.

4. The method according to claim 1, wherein the method comprises a step of exchanging service data between said service database and said service access point (SAP) by synchronizing the service data between said service database and said user database.

5. The method according to claim 1, wherein service data is replicated from the service database to the user database so that the user database has at least a partial replica copy of said service data.

6. The method according to claim 5, wherein the method comprises a step of refreshing said replica copy of the user database with at least some data related to the data of said list of services.

7. The method according to claim 3, wherein the method comprises a step of maintaining the identity and preference data in the user database.

8. The method according to claim 1, wherein a service is selected from the list of services.

9. The method according to claim 1, wherein the service data of at least one service comprises service executable application software.

10. The method according to claim 1, wherein the service data of at least one service comprises service configuration data.

11. The method according to claim 8, wherein at least some service data of said selected service is downloaded from the service database to the user database.

12. The method according to claim 11, wherein said selected service is executed using executable software binary data and configuration data available in the user database.

13. The method according to claim 8, wherein a selected service is located and invoked by using a uniform resource locator (URL) of the selected service.

14. The method according to claim 3, wherein said identity and preference data comprises information of user's location point and appropriate time information.

15. The method according to claim 3, wherein said identity and preference data comprises information of user's usage history of services.

16. The method according to claim 3, wherein said identity and preference data comprises information of user's access authorization to the list of services.

17. The method according to claim 3, wherein said identity and preference data comprises information of the configuration of the service access point (SAP).

18. The method according to claim 1, wherein the method is complient with at least one of the following communication specifications: TCP/IP, CDMA, GSM, GPRS, WCDMA, UMTS, Teldesic, Iridium, Inmarsat, WLAN and imode.

19. The method according to claim 1, wherein at least one of the following operating systems is used in the service access point (SAP): Unix, MS-windows, EPOC, NT, MSCE, Linux, PalmOS and GEOS.

20. A storage media comprising a stored, readable computer program, comprising instructions for controlling the data management system and components thereof to implement the method according to claim 1.

21. A system for managing data in a community system comprising:
- at least one community offering a plurality of services,
- at least one service database containing service data,
- at least one identity database containing user-specific data defining user preferences, and
- at least one service access point (SAP) having at least one user database and
- wherein the service access point (SAP) has a means for communicating with said at least one service database and said at least one identity database,
- wherein the managing system comprises:
  - the at least one identity database arranged to maintain user-specific data of at least one user of said at least one service access point (SAP),
  - the at least one service database arranged to maintain service data of at least one service in,
  - a means for publishing at least part of the user-specific data of the at least one identity database to the service database, and
  - a means for determining in the at least one service database a list of services from said plurality of services based on the published user-specific data for said at least one user database.

22. The system according to claim 21, wherein first synchronizing means is arranged to exchange user-specific data between said identity database and said user database of said service access point (SAP).

23. The system according to claim 21, wherein at least one identity database server containing identity and preference data is arranged to replicate at least partial replica copy of said identity and preference data to user database server.

24. The system according to claim 21, wherein second synchronizing means is arranged to exchange service data between said service database and said user database of said service access point (SAP).

25. The system according to claim 21, wherein at least one service database server containing service data is arranged to replicate at least partial replica copy of said service data to the user database server.

26. The system according to claim 25, wherein said replica copy of said service data in the user database server is refreshed with at least some data related to the data of said list of services.

27. The system according to claim 23, wherein the user database is arranged to maintain the identity and preference data.

28. The system according to claim 21, wherein a service is selected from the list of services.

29. The system according to claim 21, wherein application software is arranged to execute the service data of at least one service.

30. The system according to claim 21, wherein the service data of at least one service comprises service configuration data.

31. The system according to claim 28, wherein at least some service data of said selected service is downloaded from the service database to the user database.

32. The system according to claim 31, wherein software binary data and configuration data available in the user database is arranged to execute said selected service.

33. The system according to claim 28, wherein a uniform resource locator (URL) of the selected service is arranged to locate and invoke a selected service.

34. The system according to claim 23, wherein said identity and preference data comprises information of user's location point and appropriate time information.

35. The system according to claim 23, wherein said identity and preference data comprises information of user's usage history of services.

36. The system according to claim 23, wherein said identity and preference data comprises information of user's access authorization to the list of services.

37. The system according to claim 23, wherein said identity and preference data comprises information of the configuration of the service access point (SAP).

38. The system according to claim 21, wherein the system is arranged to be compliant with at least one of the following communication specifications: TCP/IP, CDMA, GSM, GPRS, WCDMA, UMTS, Teldesic, Iridium, Inmarsat, WLAN and imode.

39. The system according to claim 21, wherein at least one of the following operating systems is arranged to operate in the service access point (SAP) Unix, MS-windows, EPOC, NT, MSCE, Linux, PalmOS and GEOS.

40. The system according to claim 21, wherein the service assembly point (SAP) is a combination of a mobile station and a computer.

41. The system according to claim 21, wherein the service assembly point (SAP) is a database server.

42. The system according to claim 21, wherein the service assembly point (SAP) is a user terminal device.

43. The system according to claim 21, wherein the service database server and/or the identity database is arranged to operate at least one of the following operating systems: Unix, MS-windows, NT and Linux.

44. A community server for data management in a community system, the community server comprising:
- at least one community offering a plurality of services,
- at least one database containing community data,
- a means for communication between the community system and at least one service access point (SAP) having at least one user database,
- wherein the at least one master database is arranged to maintain data of at least one service,
- a means for joining said service access point (SAP) into the community system,
- a means for receiving published user-specific data defining user preferences from another database server in the community system, and
- a means for determining a list of services from said plurality of services based on the published user-specific data for said at least one user database.

45. The server according to claim 44, wherein synchronizing means is arranged to exchange data between said community server and said user database of said service access point (SAP).

46. The server according to claim 44, wherein at least one database containing service data is arranged to replicate at least partial replica copy of said service data to user database.

47. The server according to claim 46, wherein the community server is arranged to refresh said replica copy of said service data in the user database server with at least some data related to the data of said list of services.

48. The server according to claim 44, wherein the community server comprises means for maintaining service classification information.

49. The server according to claim 44, wherein the community server is arranged to be a master database server in the community database system and the user database of the service access point (SAP) a replica database server in the community database server system containing community data.

* * * * *